(12) United States Patent
Di Benedetto

(10) Patent No.: US 7,302,594 B2
(45) Date of Patent: Nov. 27, 2007

(54) QUERY OF BIOS-STORED VALUE TO DETERMINE USER INTENT AT RETURN TO ACTIVE STATE

(75) Inventor: Robert Di Benedetto, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 11/083,927

(22) Filed: Mar. 21, 2005

(65) Prior Publication Data

US 2006/0212728 A1 Sep. 21, 2006

(51) Int. Cl.
*G06F 1/00* (2006.01)
*G06F 9/00* (2006.01)
*G06F 15/177* (2006.01)
*G06F 1/24* (2006.01)

(52) U.S. Cl. .............................. 713/300; 713/1; 713/2; 713/100

(58) Field of Classification Search ................. 713/300
See application file for complete search history.

(56) References Cited

U.S. PATENT DOCUMENTS 6,742,096 B1 * 5/2004 Zucker ....................... 711/170
7,047,367 B2 * 5/2006 Nabekura et al. ........... 711/147
7,234,050 B2 * 6/2007 Agan et al. ..................... 713/1

OTHER PUBLICATIONS

Slide presentation titled "Windows Longhorn ACPI and Power Management-Part 1"; May 2004; 51 pages.

Website printout titled "LinDVD: Intervideo's DVD Multimedia Software Solution for Linux" <http://www.intervideo.com/jsp/LinDVD.jsp>; date of first publication unknown, but believed to be prior to Jan. 26, 2005; 2 pages.

Website printout titled "InterVideo InstantON" <http://www.Internetvideomag.com/News/News2004/0320_04_InterVideo.htm>; date of first publication unknown, but believed to be prior to Jan. 26, 2005; 4 pages.

Website printout titled "Welcome to the CyberLink PowerCinema Page" <http://www.gocyberlink.com/multi/products/product_main.jsp?Prodid=12>; Date of first publication unknown, but believed to be prior to Jan. 26, 2005; 2 pages.

Website printout titled "CyberLink Power Cinema 3: Top 5 Reasons to Own PowerCinema 3" <http://www.gocyberlink.com/english/products/powercinema/3/top5_reasons.jsp>; Date of first publication unknown, but believed to be prior to Jan. 26, 2005; 2 pages.

(Continued)

*Primary Examiner*—A. Elamin
*Assistant Examiner*—Stefan Stoynov
(74) *Attorney, Agent, or Firm*—Banner & Witcoff, Ltd.

(57) ABSTRACT

A computer BIOS stores a value indicative of which of several hardware components has caused the computer to return to an active state. The OS is configured, as part of a system boot or other return to an active state, to retrieve the value stored by the BIOS. The OS compares the value stored by the BIOS with multiple values, each of the multiple values corresponding to a separate hardware component. When the OS identifies a value corresponding to the value stored by the BIOS, one or more programs associated with the identified value are launched.

20 Claims, 9 Drawing Sheets

OTHER PUBLICATIONS

Advanced Configuration and Power Interface Specification, Hewlett Packard Corporation, Intel Corporation, Microsoft Corporation, Phoenix Technologies Ltd., Toshiba Corporation, Sep. 2, 2004; 602 pages.

Website printout titled "Determining a Computer's BIOS Manufacturer, Version, and Date" <http://support.microsoft.com/default.aspx?scid=kb:_en-us:61421>; Date of first publication unknown, but believed to be prior to Mar. 8, 2005 Jul. 30, 2001; 3 pages.

Website printout titled "Cyber Tech Help—What is the BIOS and how does it work?" <http://www.cybertechhelp.com/html/tutorial.php/id/57>; Date of publication unknown, but believed to be prior to Feb. 4, 2005; 4 pages.

U.S. Appl. No. 11/044,713 titled "Direct Media", filed Jan. 28, 2005.

* cited by examiner

QUERY OF BIOS-STORED VALUE TO DETERMINE USER INTENT AT RETURN TO ACTIVE STATE

FIELD OF THE INVENTION

Aspects of the invention generally relate to systems and methods for activating a computer or other electronic device.

BACKGROUND OF THE INVENTION

Many conventional computers have a similar process for reaching a fully active state from a fully powered down state, also known as "booting." Typically, booting is initiated by a computer's basic input output system (BIOS) when a user presses an ON/OFF switch. Generically, BIOS refers to software (or firmware) which interacts with a computer's hardware and with the computer's operating system (OS). BIOS is generally stored in ROM or some other type of nonvolatile memory, and a computer may have several different types of BIOS. For example, a computer may have a video adapter BIOS, a drive control BIOS, etc. The boot process is usually controlled by a system (or motherboard) BIOS. As part of the boot process, the system BIOS performs a number of low level tasks such as initializing the microprocessor, initializing various hardware, and performing various tests. The BIOS will then search for and begin loading the OS.

Once the boot process has been completed and the OS has been loaded, application programs may be started (or "launched") by entering commands through the OS. In a computer having one of various versions of the WINDOWS OS (available from Microsoft Corporation of Redmond, Wash.), for example, a user can often instruct the OS to launch an application by selecting a screen icon corresponding to that application. In some limited circumstances, one or more applications may be automatically launched when the boot process completes. For example, a computer may boot to the last state occupied by the computer when previously shut down. In such a case, one or more applications that were running at shut-down might be automatically restarted by the OS. As another example, the OS may be configured to automatically launch one or more applications every time the computer is started. An example is the "startup list" of various versions of the WINDOWS OS. In none of these cases, however, is the user able to specify an application to be launched based on how the computer is started. Stated differently, the computer is not able to know the user's intent at the time the user turns on the computer. Instead, and assuming user wishes to launch some application not on a preconfigured startup list (or that was not running when the computer last shut down), the user must wait for the computer to complete the boot process and then indicate what is desired.

This can be significant. For example, many computers include hardware and software that permit a user to play back a previously recorded DVD, CD or other type of media. By inclusion of an appropriate tuner and other electronic components, many computers are also able to receive radio and/or television transmissions. As computers, and particularly laptop computers, become more advanced and more compact, and as the number of people owning and using computers continues to grow, these (and other) media playback functions become increasingly important. It is frequently desirable to make the media playback functionality of a computer more similar to that of consumer electronic devices that are dedicated to media playback (e.g., dedicated DVD players, televisions, radios, etc.). Instead of a user having to boot a computer and then select a media playback application, a user wishing to watch a DVD on that computer would often find it more convenient to simply put the DVD in the computer's DVD player and begin watching.

There have been some efforts in this regard to make computers more like dedicated media playback devices. One technique is to configure a computer for dual booting. More specifically, two separate OSs are installed on the computer in separate partitions of the hard drive (or one operating system may be installed in the hard drive and another OS may reside in firmware). One OS, which may be smaller and/or more specialized (e.g., Linux, or the WINDOWS CE OS available from Microsoft Corporation) is booted when the user only wishes to perform media playback. When the user wishes to use the computer for other purposes, the other OS (e.g. the WINDOWS XP OS) is booted.

A dual-boot solution presents several problems, however. Even though a first (or "primary") OS and a second OS intended for media playback may operate in separate partitions, the media-playback OS may still have access to the file structure of the primary OS. This can have serious security and privacy implications, especially if the second OS is allowed to read and/or write data to the partition managed by the first OS. In such a case, any access control or other security mechanisms of the first OS can be bypassed by the second OS. On the other hand, disallowing cross-partition access also presents problems. If there is no cross-partition access, a user would not have full access to media files stored on another partition.

A dual-boot system can also pose significant burdens upon a computer manufacturer. For example, the primary OS (i.e., the OS used for conventional purposes and not limited to media playback) could be manufactured by one company, and the OS used for media playback may be manufactured by a second company or be an open-source product. If the two OSs are provided by separate companies, the computer manufacturer may be forced to pay two separate license fees. Even if one OS is open source, the computer manufacturer would usually bear the financial burden of any required modifications to the open source OS. The manufacturer would also be required to create duplicate media hardware drivers for each OS. Providing technical support, product updates and patches for two OSs could also be significantly more complex than is the case with a single OS.

Aside from the financial and security implications of installing and supporting two different OSs, a dual boot system is often unsatisfactory from a user perspective. In a dual-boot environment, a user must reboot or power down if he or she wishes to switch from a media-playback mode to a normal operating mode. This results in a transition from one OS to another which is abrupt and undesirable from a usability point of view. For example, pausing a movie to read a document, check e-mail or perform some other task would be cumbersome.

Several solutions to the above described challenges are described in commonly-owned, co-pending U.S. patent application Ser. No. 11/044,713 (filed Jan. 28, 2005 and titled "Direct Access to Media Playback), incorporated by reference herein (no admission is made herein regarding whether said application is prior art to the present invention). Among the solutions described in application Ser. No. 11/044,713 is the creation of a Human Interface Device (HID) event report in connection with a user actuation of a dedicated media playback button. Embodiments of the present invention offer a useful alternative to the solution in the Ser. No. 11/044,713 application. In some circumstances, for example, the software components needed for generation and processing of a HID report may not be present.

SUMMARY OF THE INVENTION

In at least some embodiments of the invention, a BIOS stores a value indicative of which of several hardware components has caused a computer to return to an active state. Such controls could include, but are not limited to, a power ON/OFF button, a dedicated media playback button, a DVD drive, and a timer for automatically activating the computer at a predesignated time. The OS is configured, as part of a system boot or other return of the computer to an active state, to retrieve the value stored by the BIOS. The OS then compares that value with a collection of possible values. When the OS identifies a value in the collection corresponding to the value stored by the BIOS, one or more programs associated with the identified value are launched.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF THE PREFERRED EMBODIMENTS

Figure 1:
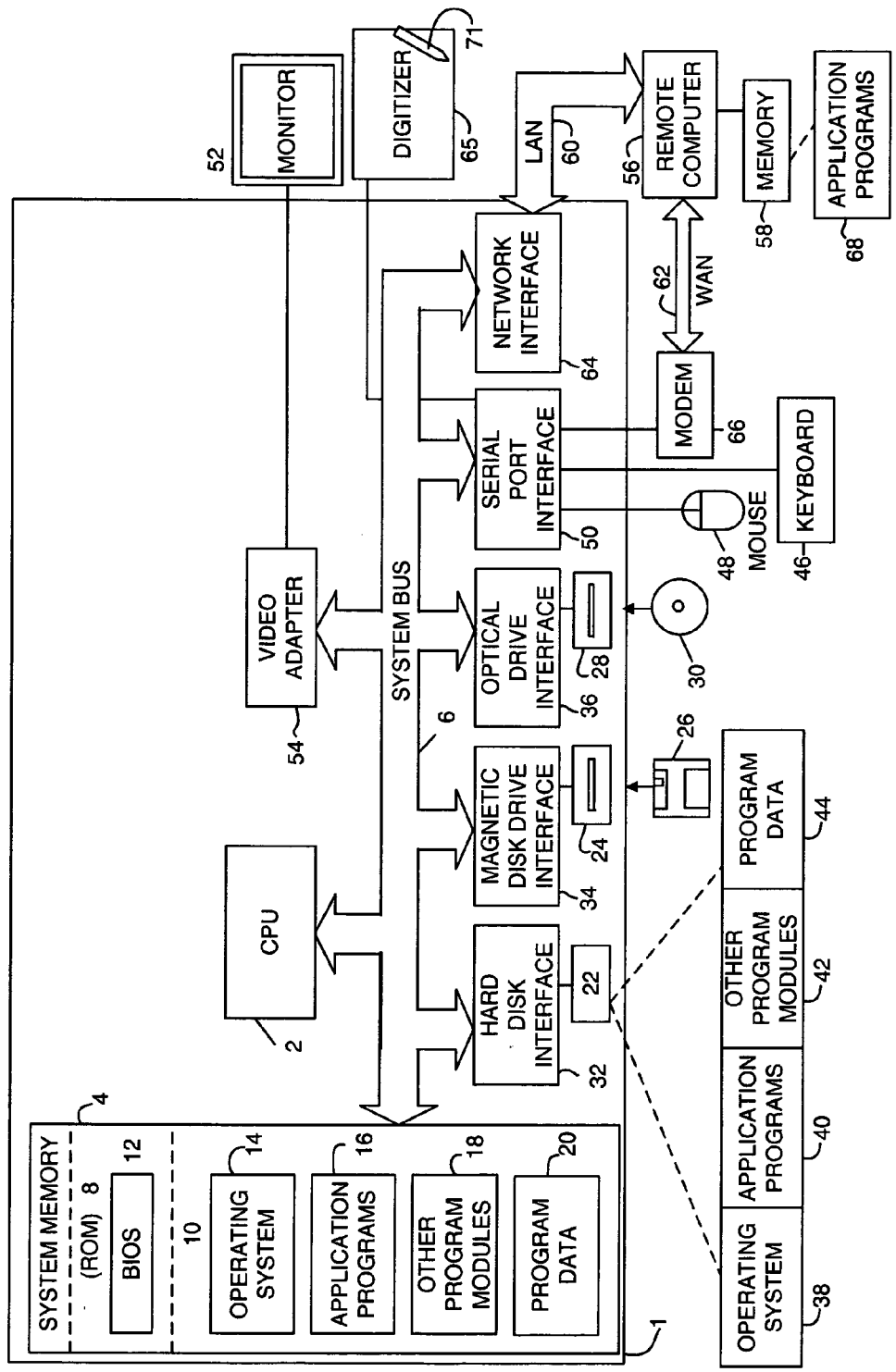
FIG. 1 is a block diagram of an example of a computing system environment in which embodiments of the invention may be implemented.

FIG. 1 illustrates an example of a suitable computing system environment in which the invention may be implemented. The computing system environment is only one example of a suitable computing environment and is not intended to suggest any limitation as to the scope of use or functionality of the invention. Neither should the example computing environment be interpreted as having any dependency or requirement relating to any one or combination of components illustrated in FIG. 1. Embodiments of the invention will also be described using examples based on versions of the WINDOWS operating system. However, the invention is not limited to implementation in connection with a specific operating system.

The invention is operational with numerous other general purpose or special purpose computing system environments or configurations. Examples of well known computing systems, environments and/or configurations that may be suitable for use with the invention include, but are not limited to, personal computers, hand-held or laptop devices, multi-processor systems, microprocessor-based systems, mini-computers, and the like. The invention is described in the general context of computer-executable instructions, such as program modules, being executed by a computer. Generally, program modules include routines, objects, components, data structures, etc. that perform particular tasks or implement particular abstract data types.

With reference to FIG. 1, an exemplary system for implementing the invention includes a general purpose computing device in the form of a computer 1. Hardware components of computer 1 may include, but are not limited to, central processing unit (CPU) 2, system memory 4 and system bus 6 that couples various system components (including system memory 4) to CPU 2. System bus 6 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus also known as Mezzanine bus.

Computer 1 typically includes a variety of computer readable media. Computer readable media can be any available media that can be accessed by computer 1 and includes both volatile and nonvolatile media, removable and non-removable media. By way of example, and not limitation, computer readable media may include computer storage media and communication media. Computer storage media includes volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 4 includes computer storage media in the form of volatile and/or nonvolatile memory such as read only memory (ROM) 8 and random access memory (RAM) 10. Basic input/output system 12 (BIOS), containing the basic routines that help to transfer information between elements within computer 1, such as during start-up, is typically stored in ROM 8. RAM 10 typically contains data and/or program modules that are immediately accessible to and/or presently being operated on by CPU 2. By way of example, and not limitation, FIG. 1 illustrates operating system (OS) 14, application programs 16, other program modules 18 and program data 20. For convenience, this detailed description of the preferred embodiments will refer to actions being taken by BIOS 12, by OS 14, by application programs 16, etc. Persons skilled in the art will recognize that this refers to processing by CPU 2 (or other processing hardware) of instructions stored as part of BIOS 12, OS 14, application programs 16, etc.

Computer 1 may also include other removable/non-removable, volatile/nonvolatile computer storage media. By way of example only, FIG. 1 illustrates hard disk drive 22 that reads from or writes to non-removable, nonvolatile magnetic media, magnetic disk drive 24 that reads from or writes to removable, nonvolatile magnetic disk 26 and optical disk drive 28 that reads from or writes to removable, nonvolatile optical disk 30 such as a CD ROM, CDRW, DVD or other optical media. Other removable/non-removable, volatile/nonvolatile computer storage media that can be used in the exemplary operating environment include, but are not limited to, magnetic tape cassettes, flash memory cards, digital video tape, solid state RAM, solid state ROM, and the like. Hard disk drive 22 is typically connected to system bus 6 through a non-removable memory interface such as interface 32, and magnetic disk drive 24 and optical disk drive 28 are typically connected to system bus 6 by a removable memory interface, such as interfaces 34 and 36.

The drives and their associated computer storage media, discussed above and illustrated in FIG. 1, provide storage of computer readable instructions, data structures, program modules and other data for computer 1. In FIG. 1, for example, hard disk drive 22 is illustrated as storing OS 38, application programs 40, other program modules 42 and program data 44. Note that these components can either be the same as or different from OS 14, application programs 16, other program modules 18 and program data 20. OS 38, application programs 40, other program modules 42 and program data 44 are given different numbers here to illustrate that, at a minimum, they are different copies. A user may enter commands and information into computer 1 through input devices such as keyboard 46, pointing device 48 (shown as a mouse, but which could be a trackball or touch pad) and stylus 71 (in conjunction with digitizer 65). Other input devices (not shown) may include a microphone, joystick, game pad, satellite dish, scanner, or the like. These and other input devices are often connected to processing unit 2 through user input interface 50 that is coupled to the system bus. Although mouse 48, keyboard 46, digitizer 65 and modem 66 are shown in FIG. 1 as connected to computer 1 through a serial port, these and other devices may be connected to computer 1 through other ports (e.g., a parallel port, PS/2 port, game port or a universal serial bus (USB) port) and related interfaces and structures. Monitor 52 or other type of display device is also connected to system bus 6 via an interface, such as video interface 54. In addition to the monitor, computers may also include other peripheral output devices such as speakers (not shown) and a printer (not shown), which may be connected through an output peripheral interface (not shown).

Computer 1 may operate in a networked environment using logical connections to one or more remote computers, such as remote computer 56. Remote computer 56 may be a personal computer, a server, a router, a network PC, a peer device or other common network node, and typically includes many or all of the elements described above relative to computer 1, although only memory storage device 58 has been illustrated in FIG. 1. The logical connections depicted in FIG. 1 include local area network (LAN) 60 and wide area network (WAN) 62, but may also include other networks. Such networking environments are commonplace in offices, enterprise-wide computer networks, intranets and the Internet.

When used in a LAN networking environment, computer 1 is connected to LAN 60 through network interface or adapter 64. When used in a WAN networking environment, computer 1 may include modem 66 or other means for establishing communications over WAN 62, such as the Internet. Computer 1 may also access WAN 62 and/or the Internet via network interface 64. Modem 66, which may be internal or external, may be connected to system bus 6 via user input interface 50 or other appropriate mechanism. In a networked environment, program modules depicted relative to computer 1, or portions thereof, may be stored in the remote memory storage device. By way of example, and not limitation, FIG. 1 illustrates remote application programs 68 as residing on memory device 58. It will be appreciated that the network connections shown are exemplary and other means of establishing a communications link between computers may be used.

Figure 2:
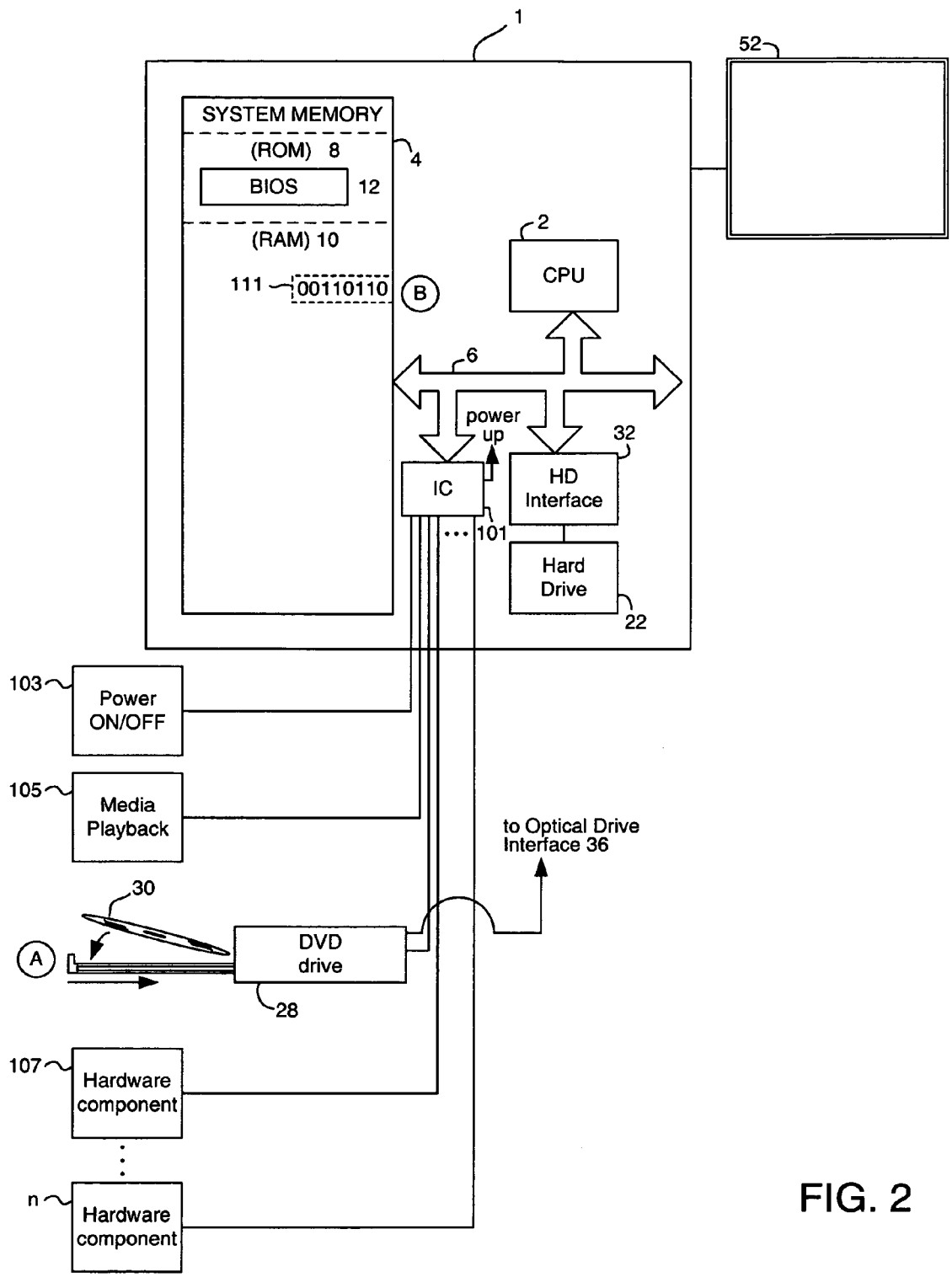
FIGS. 2-4 are block diagrams showing activation of a computer and launching of an application program, according to at least some embodiments of the invention, in response to user manipulation of a hardware control.

FIG. 2 shows additional details of computer 1 according to at least some embodiments of the invention. Various components shown in FIG. 1 have been omitted in FIG. 2 for purposes of clarity. In FIG. 2, computer 1 includes various hardware components which a user can manipulate so as to bring computer 1 to a fully powered, active state. For example, and similar to existing computers, a user can press power switch 103 when computer 1 is shut down and cause computer 1 to boot in a conventional manner (i.e., to a generic state or to a state previously occupied by computer 1 at the last shutdown). If a user presses media playback button 105 when computer 1 is shut down, computer 1 will boot and automatically launch a media player application (e.g., the WINDOWS MEDIA PLAYER FOR WINDOWS XP media player application, available from Microsoft Corporation). In a similar manner, a user can also cause computer 1 to boot and automatically launch a media player program by placing a DVD 30 in DVD player 28 (identified more generically as optical drive 28 in FIG. 1). Computer 1 may have numerous other hardware components 107 through n with which computer 1 can be brought to an active state from an OFF or other inactive condition. For example, computer 1 could have separate buttons corresponding to an email viewer or to a web browser. Pressing one of those buttons when computer 1 is OFF would cause computer 1 to boot and automatically launch an email client or an Internet browsing application. As but another possibility, conventional hardware devices or input controls could be modified so that they cause computer 1 to boot and launch an appropriate application. For example, removing stylus 71 (FIG. 1) from a cradle (not shown) could cause computer 1 to boot and launch a graphics application. As yet another possibility, and as described in more detail below, one of hardware devices 107 through n could be a timer which causes computer 1 to boot and launch a previously selected program. The ellipsis between blocks 107 and n indicates that the invention is not limited by the number of such devices.

When any of hardware devices 103 through n is manipulated by a user, power is supplied to computer 1 and the booting process begins. As part of the booting process, the identity of the hardware component initiating the boot is made available to BIOS 12. This can be accomplished in various manners. For example, each hardware control capable of starting computer 1 may be connected to separate pin of one or more integrated circuits (ICs) 101. When IC 101 receives a signal at one of the pins connected to devices 103 through n, IC 101 causes computer 101 to apply power to various system components and begin booting (shown as "power up" in FIG. 2). IC 101 retains an indicator of the pin on which it received a signal from one of devices 103-n, which indicator can be accessed by BIOS 12 (e.g., by CPU 2 executing instructions of BIOS 12).

In FIG. 2, and while computer 1 is shut down, a user has placed DVD 30 in DVD drive 28 (step A). As a result, a signal is applied to one of the pins of IC 101 and causes computer 1 to begin booting. As part of the boot process, BIOS 12 accesses IC 101 (via system bus 6 or via some other connection) and retrieves an indicator of the IC 101 pin on which the start up signal was received. BIOS 12 then compares that pin identity to a look-up table (not shown) and stores a code for the appropriate hardware component in a memory location 111 within RAM 10. In the example of FIG. 2, BIOS 12 has stored (at step B) the code "00110110" corresponding to DVD drive 30. In at least some embodiments, a single byte of memory space is reserved to hold a code indicating the hardware component which causes computer 1 to boot. With 8 bits available in memory location 111, up to 256 different hardware component codes can be stored.

Figure 3:
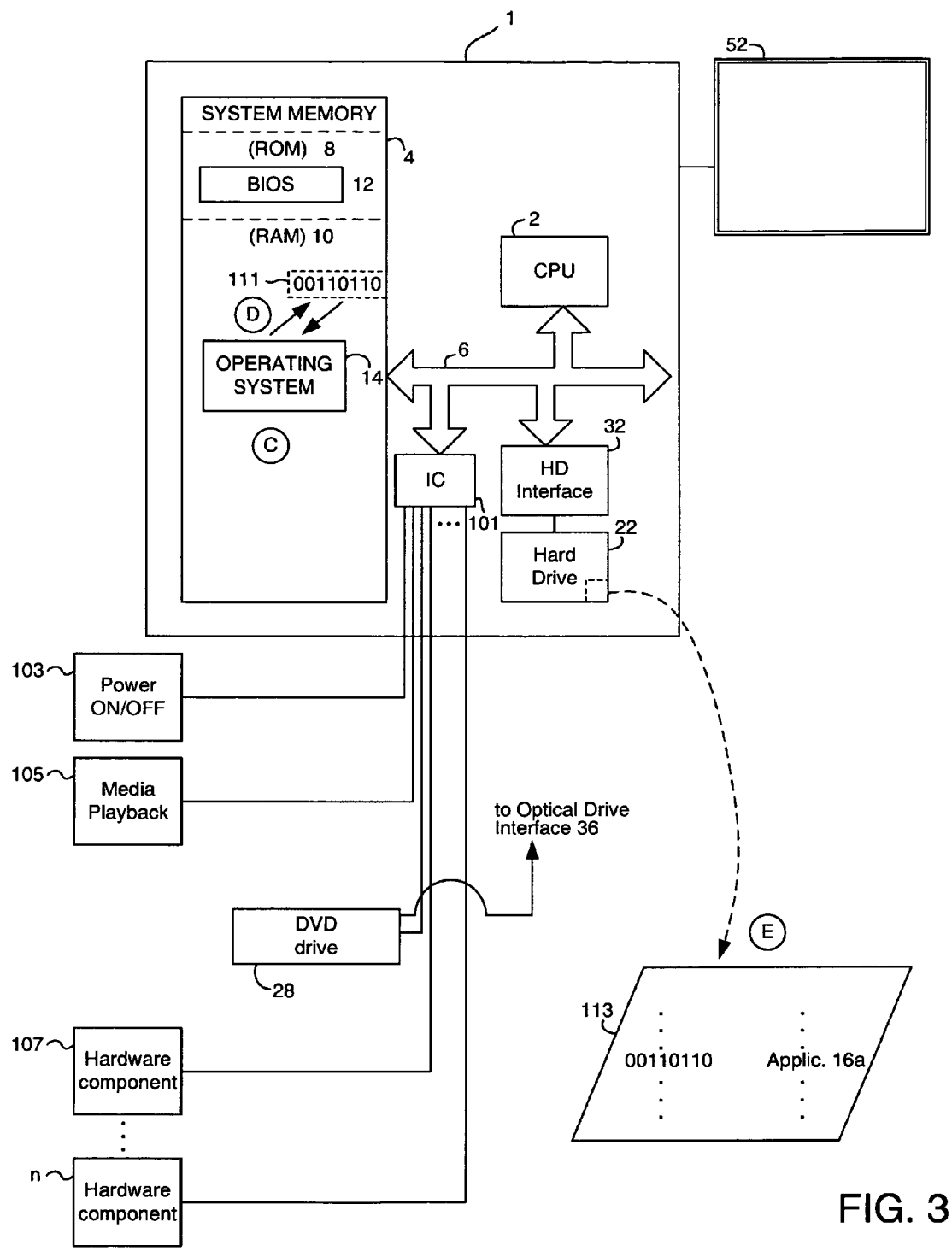

The booting process continues in FIG. 3. BIOS 12 loads OS 14 into RAM 10 (step C). In at least some embodiments, OS 14 is configured retrieve the value stored in memory location 111 whenever OS 14 is loaded during the booting process. This is shown at step D in FIG. 3 as a pair of arrows between OS 14 and memory location 111. OS 14 is further configured to automatically take action based on the retrieved value. For example, a first value could correspond to a boot in response to pressing of power switch 103. In such a case, OS 14 would boot normally, i.e., without launching an application corresponding to a control by which the user has started the computer. Another value could correspond to pressing of media playback button 105, resulting in the automatic launch of a media player application. Yet another value could correspond to the user pressing an "Internet" button, resulting in the automatic launch of a web browser. Additional examples are readily apparent in view of the description herein.

Figure 4:
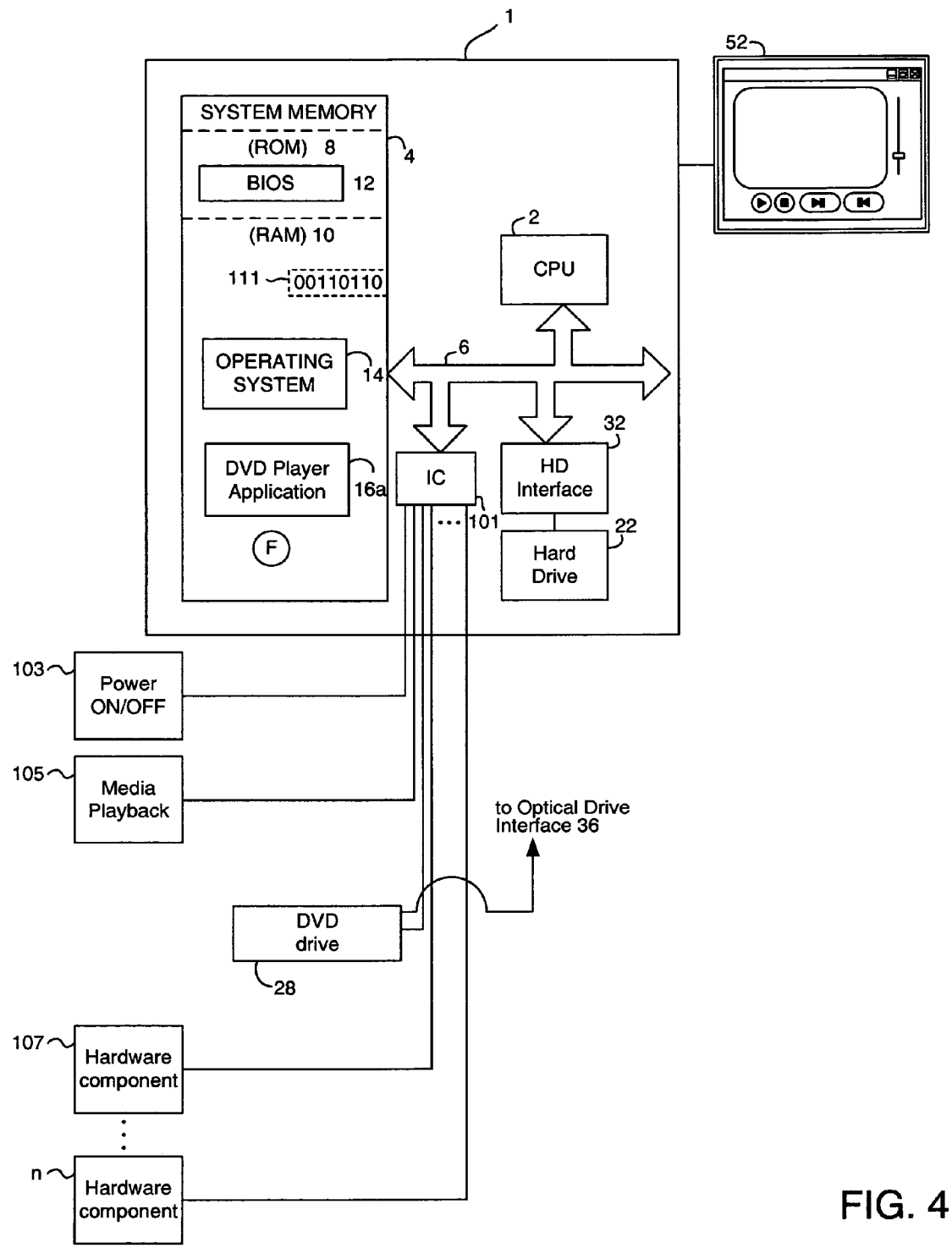

In at least some embodiments, and as shown in FIG. 3 at step E, OS 14 refers to one or more files 113 stored in hard drive 22. File 113 contains a plurality of bit masks corresponding to possible values which might be retrieved from memory location 111. In other words, file 113 contains bit masks corresponding to the hardware devices which can cause return of computer 1 to an active state. Associated with each bit mask are one or more programs. If a bit mask in file 113 matches a value stored in memory location 111, the program associated with the matched value is launched by OS 14. In the present example, OS 14 identifies the "00110110" value as matching the value in memory location 111, and determines that application 16a (a DVD player application) is to be automatically launched when the boot is complete. As shown in FIG. 4 (step F), OS 14 accordingly launches DVD player application 16a as soon as the booting process is finished.

Although FIG. 3 only shows a single application associated with the 00110110 bit mask, this need not be the case. For example, two, three or more applications could be associated with a particular bit mask. In such a case, all would be launched at the conclusion of the booting process. Similarly, the programs associated with a particular bit mask need not be application programs. The program(s) associated with a bit mask could be portions of an application program, OS routines, or other actions initiatable by OS 14. The choice of program(s) or actions associated with one or more of the bit masks in file 113 is also configurable by the user.

Figure 5:
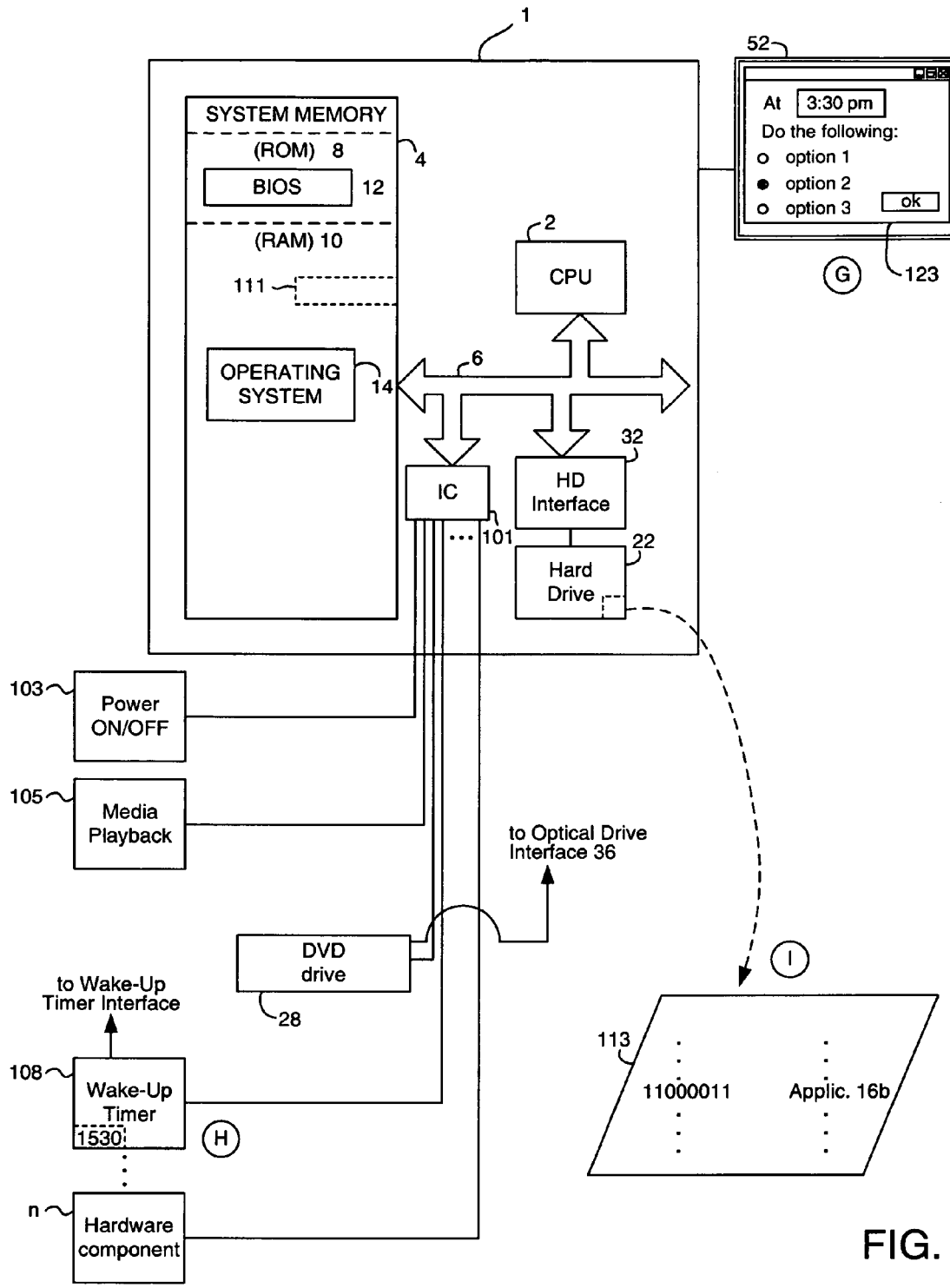
FIGS. 5-7 are block diagrams showing activation of a computer and launching of an application program, according to at least some embodiments of the invention, in response a timer signal.
Figure 6:
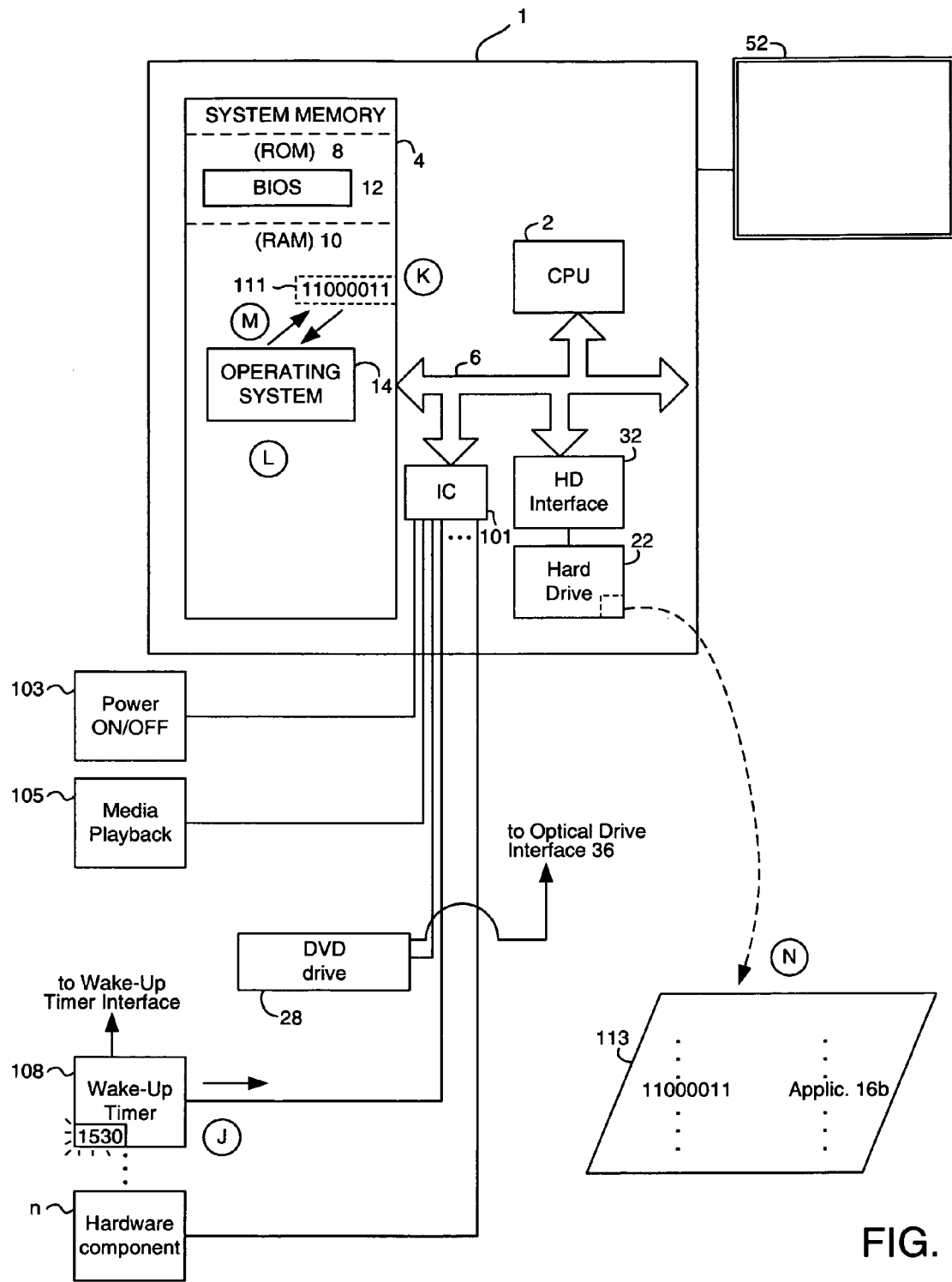
Figure 7:
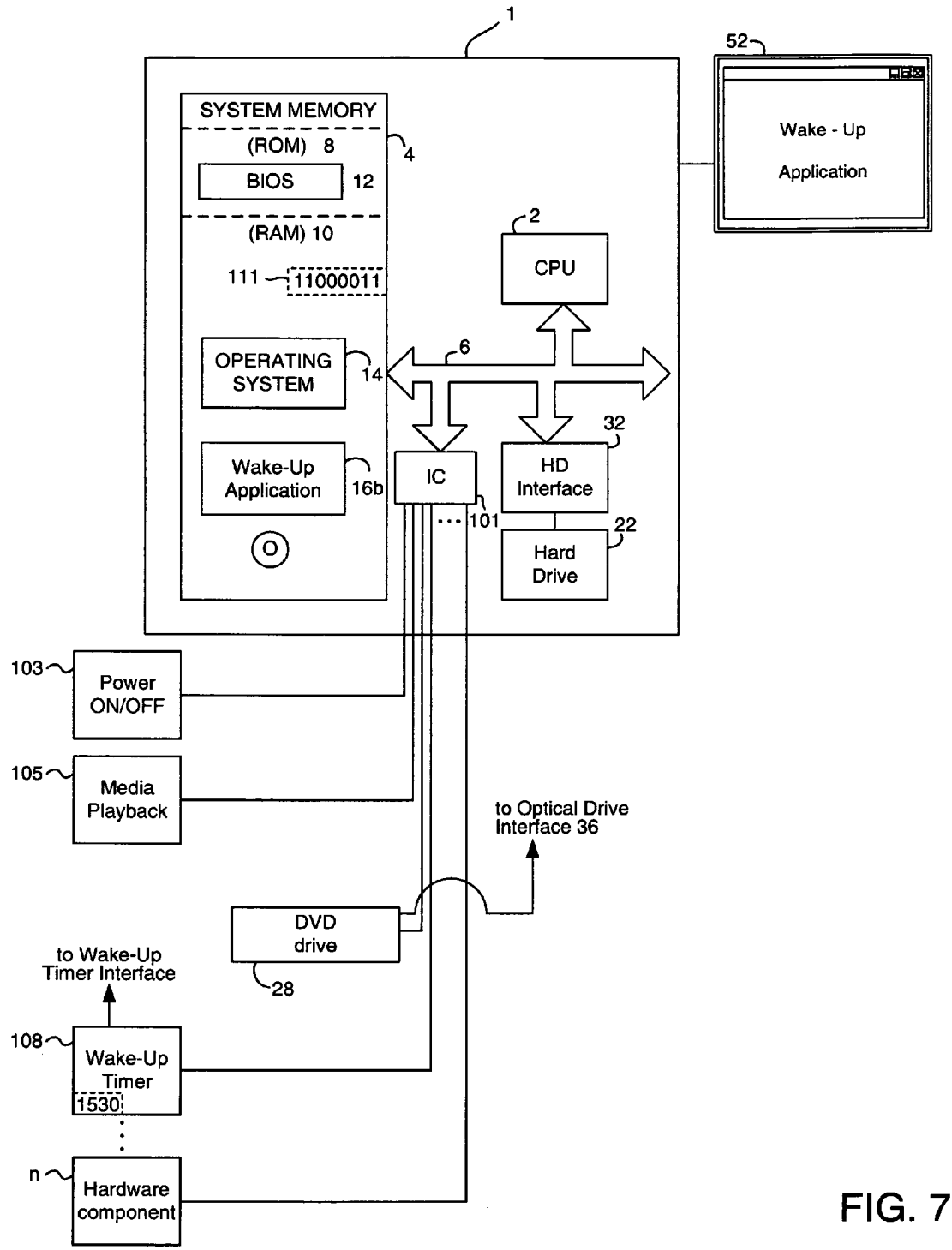

FIGS. 5-7 illustrate activation of computer 1 in response to a signal from "wake-up" timer hardware component 108. Wake-up timer 108 is a battery-powered hardware component which either monitors a system clock or has its own battery-powered separate clock. Wake-up timer 108 is accessible by OS 14 via one or more interfaces (not shown), and can be configured by OS 14 to activate (or awaken) computer 1 at a desired time. Because implementation of wake-up timer 108 and any associated interface(s) are routine matters within the technical abilities of persons of ordinary skill in the art (once provided with the description herein), additional details of wake-up timer 108 and related interfaces are not included.

In FIG. 5, a display interface 123 permits a user to configure computer 1 to boot and perform a desired action at a designated time. At step G, the user sets the time for computer 1 to automatically boot (3:30 p.m.). The user also selects one of "option 1," "option 2" or "option 3" as the action to be performed after booting. For example, "option 1" could result in computer 1 booting and playing a prerecorded sound file (e.g., music), thereby allowing the use of computer 1 as an alarm clock. Option 2 could result in computer 1 booting and opening a video connection with a remote party. In this manner, computer 1 could be preset for a scheduled teleconference. Option 3 could result in computer 1 booting and downloading a data file (e.g., a daily stock update). Interface 123 is merely intended as one example of an interface for configuring wake-up timer 108, and a user would not necessarily be limited to three options. Similarly, a user could also configure computer 1 to perform multiple actions (e.g., launch multiple applications) upon completing a boot initiated by wake-up timer 108.

In step H of FIG. 5, OS 14 accesses wake-up timer 108 and configures timer 108 to initiate a boot at 3:30 p.m. At step I, OS 14 stores data in one or more files 113 representing applications to be launched at the next boot caused by wake-up timer 108. As shown in FIG. 5, the bit mask for wake-up timer 108 is 11000011. Sometime subsequent to step I, computer 1 is shut down (not shown).

In FIG. 6, wake-up timer 108 automatically initiates the booting process at 3:30 p.m. (step J). As in FIG. 3, BIOS 12 stores in memory location 111 a code corresponding to the pin on which it receives the signal from the hardware component initiating the boot. In this case, and as shown at step K, BIOS 12 stores a code of "11000011" corresponding to the pin receiving the signal from wake-up timer 108. As the boot continues, OS 14 is loaded (step L). As in the example of FIGS. 2-4, OS 14 is configured to automatically retrieve the value stored in memory location 111 whenever OS 14 is loaded during a boot of computer 1, and to then determine what programs to launch based on that retrieved value. Accordingly, and as seen at step M, OS 14 retrieves the value stored in memory location 111. At step N, OS 14 compares the retrieved value against bit masks in file 113 and determines that application 16b (the application previously stored in step I) is to be launched when the boot is complete. OS 14 then loads application 16b at step O (FIG. 7).

Although FIGS. 5-7 show configuration of wake-up timer 108 as being native to OS 14, this need not be the case. A separate application program could be used for the same purpose.

Figure 8:
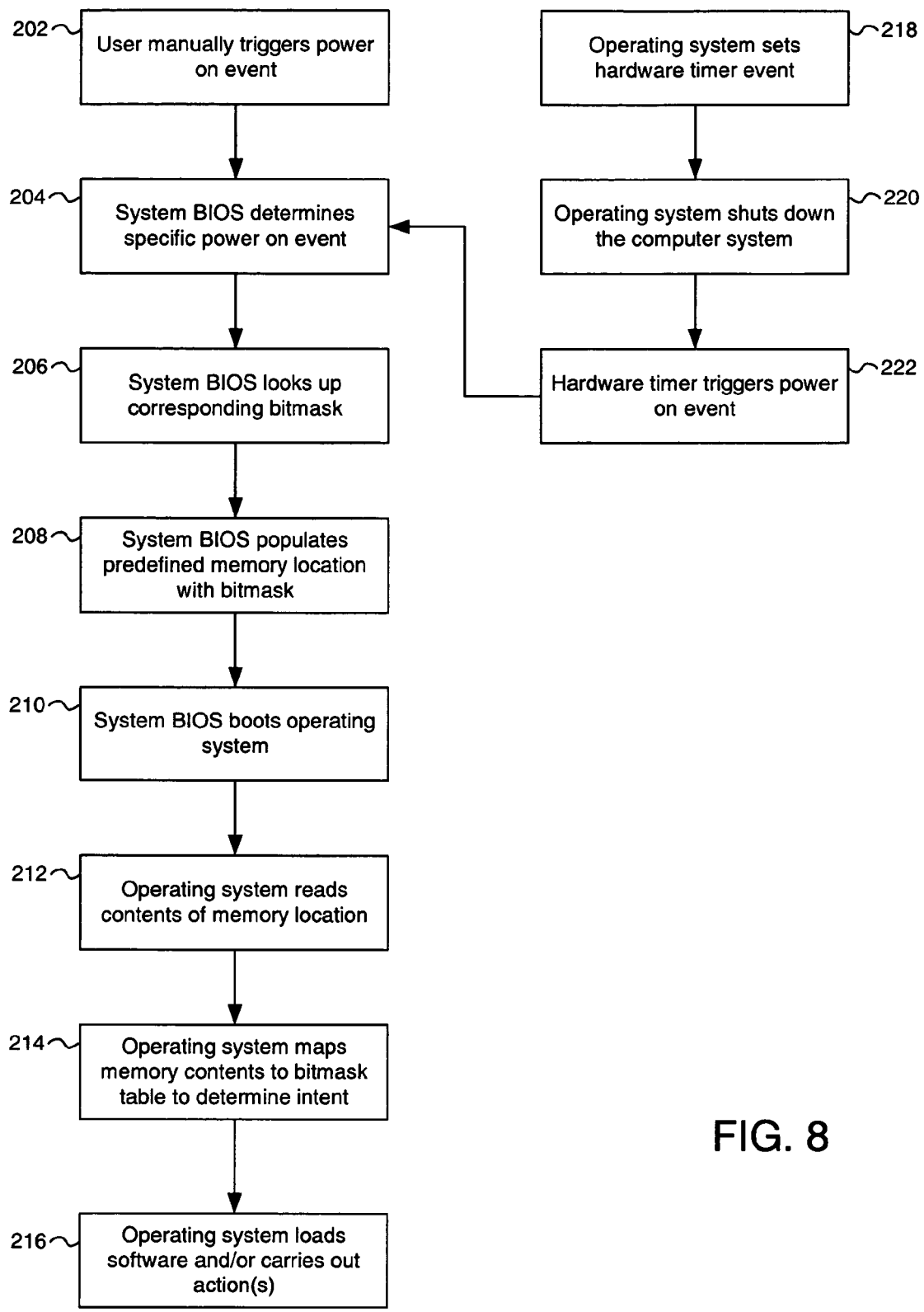
FIG. 8 is a flow chart showing operation of at least some embodiments of the invention.

FIG. 8 is a flow chart outlining the operations described in FIGS. 2 through 7. As seen in FIG. 8, block 204 can be reached by two alternate paths. In the first path starting at block 202, a user manually triggers a power-on event (and initiates a boot) by manipulating a hardware component.

This corresponds to step A of FIG. 2, where a user inserts a DVD into a DVD drive, but could also correspond to pressing power ON/OFF switch 103, pressing media playback button 105, or actuation of another hardware component. Alternatively, block 204 is reachable from a second path beginning at block 218. Specifically, a system power-on and boot could be initiated by a hardware timer instead of direct user manipulation of a hardware component. In block 218, an OS sets a hardware timer event by configuring the timer to initiate a boot at a particular time, and by configuring the program(s) to be launched and/or other actions to be taken in response to a timer-initiated boot. In the example of FIGS. 5-7, this corresponds to steps H and I. In block 220, the OS shuts down the computer (not specifically shown in FIGS. 4-7). In block 222, the hardware timer powers on the computer at the time configured in block 218. In the example of FIGS. 5-7, this corresponds to step J (FIG. 6). From block 222, the operation proceeds to block 204.

In block 204, the system BIOS (e.g., BIOS 12 in FIGS. 1-7) determines what has initiated the current booting process. In the example FIGS. 2-7 BIOS 12 performs this step by determining the pin of IC 101 receiving the boot-initiating signal. After determining in block 204 which control has initiated the current boot, operation proceeds to block 206. In block 206, the system BIOS looks up a corresponding bit pattern for the boot-initiating control (the lookup in block 206 is not specifically shown in FIGS. 2-7). After identifying the proper bit pattern in block 206, operation proceeds to block 208 and the system BIOS populates a predefined memory location with the looked-up bit pattern. This corresponds to step B in FIG. 2 and step K of FIG. 6.

After populating the predefined memory location in block 208, the operation proceeds to step 210, where the system BIOS boots the OS. At block 212, the OS reads the data stored in the predefined memory location by the system BIOS. This corresponds to step D in FIG. 3 and to step M in FIG. 6. From block 212, operation proceeds to block 214. In block 214, the OS maps the contents of the predefined memory location to a table of bit masks in order to determine the user intent at startup (e.g., the program or other action the user wishes to be executed in connection with starting the computer). In the example of FIG. 3, this is shown as step E. In the example of FIG. 6, this is shown at step N. In block 214, the OS loads the software and/or carries out actions identified in block 212 (step F of FIG. 4, step O of FIG. 7).

Figure 9:
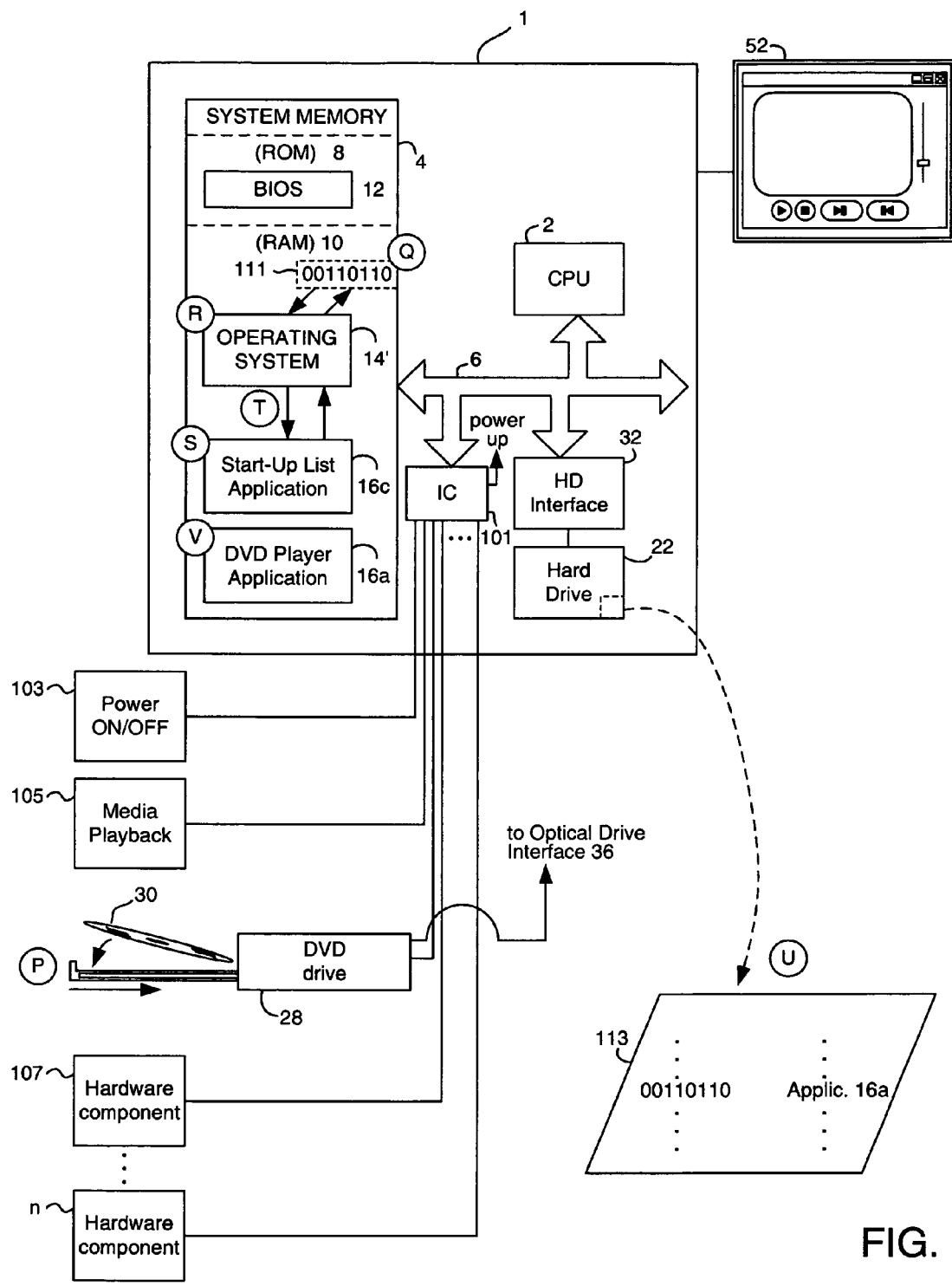
FIG. 9 is a block diagram showing activation of a computer and launching of an application program according to additional embodiments of the invention.

FIG. 9 is a block diagram showing operation of at least one alternate embodiment of the invention. In FIG. 9, and similar to FIGS. 2-7, computer 1 returns to an active state in response to a signal from a hardware device, and a designated application is launched based on the identity of the device causing computer 1 to return to an active state. In the embodiment of FIG. 9, however, some of the operations performed by OS 14 in FIGS. 2-7 are performed by a separate application program 16c.

At step P, a user places DVD 30 in drive 28 while computer 1 is shut down. As a result, a signal is applied to one of the pins of IC 101 and causes computer 1 to begin booting. As part of the boot process, BIOS 12 accesses IC 101 and retrieves an indicator of the IC 101 pin on which the start up signal was received. BIOS 12 compares that pin identity to a look-up table (not shown), and at step Q stores a code (00110110) for the appropriate hardware component in memory location 111. As the boot continues, OS 14' is loaded at step R. Unlike OS 14 in FIGS. 2-7, however, OS 14' is not configured to check memory location 111 upon every boot.

Instead, OS 14' is configured to automatically launch an application 16c at the conclusion of every boot (regardless of the hardware control initiating the boot). Application 16c may be, e.g., an application included in a startup list (as discussed above). Accordingly, application 16c is launched at step S. Application 16c is configured to retrieve the value stored in memory location 111. Application 16c retrieves that value at step T by issuing appropriate commands to OS 14', which then reads memory location 111 and returns the stored value to application 16c. As but one possible example for computers using various versions of the WINDOWS OS, the "debug" command can be used to retrieve the value of a specified memory location.

Upon retrieving the BIOS-stored value from memory location 111, application 16c compares the retrieved value to one or more bit masks stored in file 113 (step U). Application 16c identifies the "00110110" value as matching the value in memory location 111, and determines that application 16a (a DVD player application) is to be launched. Application 16c then launches application 16a (e.g., by issuing the appropriate commands to OS 14') at step V.

In the examples thus far, computer 1 has been returned to an active state by being booted from an OFF state. However, the invention is not limited in this regard. For example, computer 1 may not be completely OFF when a signal from a hardware component is received. Instead, computer 1 may be in one or more intermediate reduced power (or "sleeping") states. Instead of completely shutting down a computer so as to require a full OS reboot when returning the computer to a working state, various intermediate power-down states can be invoked. Returning a computer to a fully active state from one of these intermediate states is generally faster than a reboot. Various system states are defined in the Advanced Configuration Power Interface Specification (revision 3.0) ("ACPI specification"), available from <http://www.acpi.info/>, incorporated by reference herein for purposes of illustrating the state of the art. In a G0 (or working) state, the computer is executing user-made application threads and is responding to external events in real time. State S3 is defined as a low-latency sleeping state. Power is removed from the CPU, cache and chipset in an S3 state, but is maintained to system memory (RAM). Returning the computer to a G0 state (or "waking" the computer) is relatively fast, as previous programming context is still in RAM. State S4 is defined as a lower-power, longer wake-latency sleep state. When entering an S4 state, current platform context (e.g., system and programming settings) is saved from RAM to the hard drive, and power is then removed from the RAM, CPU, cache and chipset. When the system is returned to G0 from S4, platform context is restored from the hard drive without rebooting the OS. Waking from S4 requires more time than waking from an S3 state, but less time than an OS reboot. State S5 is defined as a "soft" off state. Context is not saved from RAM to the hard drive, and a complete OS reboot is necessary for returning to a G0 state.

In the examples of FIGS. 2-7 and 9, computer 1 is transitioning from an S5 state to a G0 state. If computer 1 were in an S3 state, however, a wake-up timer signal or user manipulation of a hardware component would result in computer 1 being returned to an active (G0) state and population of memory location 111 with a value corresponding to the timer or other hardware component initiating the "wake-up." OS 14 is further configured to perform steps in response to an S3-to-G0 wake-up similar to those performed in response to reboot from S5. In other words, OS 14 retrieves the value from memory location 111, identifies the program(s) corresponding to that value, and launches the identified program(s). If computer 1 were in an S4 state, a wake-up timer signal or user manipulation of a hardware component would similarly result in computer 1 being returned to an active (G0) state and population of memory location 111 with a value corresponding to the appropriate hardware component, with OS 14 also configured to perform the similar steps in response to an S4-to-G0 wake-up that are performed in response to reboot from S5.

Although specific examples of carrying out the invention have been described, those skilled in the art will appreciate that there are numerous other variations and permutations of the above described systems and techniques that fall within the spirit and scope of the invention as set forth in the appended claims. These and other modifications are within the scope of the invention as defined by the attached claims. Various portions of the claims are prefaced with letter or number references for convenience. However, use of such references does not imply a temporal relationship not otherwise required by the language of the claims.

The invention claimed is:

1. A method for performing an action in response to a signal from a hardware component in a computer having a Basic Input Output System (BIOS), the method comprising the steps of:
   (a) automatically accessing a first memory location upon return of the computer to a fully active state, and wherein
      (i) the first memory location contains an identifying data value, and
      (ii) the identifying data value was stored in response to instructions of the BIOS initiated by a signal from a hardware component of a plurality of hardware components, and
      (iii) the signal was issued by the hardware component prior to return of the computer to the fully active state;
   (b) comparing the identifying data value with a collection of identifying data values, each value of the collection corresponding to a different one of the plurality of hardware components; and
   (c) performing an action, based on the comparison of step (b), corresponding to the hardware component.

2. The method of claim 1, wherein steps (a) through (c) are performed by an operating system of the computer.

3. The method of claim 1, wherein step (c) comprises launching an application program associated with the hardware component.

4. The method of claim 1, wherein steps (a) through (c) are performed without reliance upon a Human Interface Device (HID) report corresponding to the hardware component.

5. The method of claim 1, wherein:
   the identifying data value comprises a series of bits, and
   step (b) comprises comparing the identifying data value with one or more bit masks.

6. The method of claim 1, wherein step (b) comprises matching the identifying data value to a data value of the collection corresponding to a user-manipulatable hardware component.

7. The method of claim 6, wherein the user-manipulatable hardware component is a removable media drive.

8. The method of claim 1, wherein step (b) comprises matching the identifying data value to a data value of the collection corresponding to a timer configured to issue an activation signal at a pre-determined time.

9. A computer-readable storage medium having stored thereon data representing sequences of instructions which, when executed by a processor, cause the processor to perform steps of a method for performing an action in response to a signal from a hardware component in a computer having a Basic Input Output System (BIOS), the method comprising the steps of:
   (a) automatically accessing a first memory location upon return of the computer to a fully active state, and wherein
      (i) the first memory location contains an identifying data value, and
      (ii) the identifying data value was stored in response to instructions of the BIOS initiated by a signal from a hardware component of a plurality of hardware components, and
      (iii) the signal was issued by the hardware component prior to return of the computer to the fully active state;
   (b) comparing the identifying data value with a collection of identifying data values, each value of the collection corresponding to a different one of the plurality of hardware components; and
   (c) performing an action, based on the comparison of step (b), corresponding to the hardware component.

10. The computer-readable storage medium of claim 9, wherein steps (a) through (c) are performed by an operating system of the computer.

11. The computer-readable storage medium of claim 9, wherein step (c) comprises launching an application program associated with the hardware component.

12. The computer-readable storage medium of claim 9, wherein steps (a) through (c) are performed without reliance upon a Human Interface Device (HID) report corresponding to the hardware component.

13. The computer-readable storage medium of claim 9, wherein:
   the identifying data value comprises a series of bits, and
   step (b) comprises comparing the identifying data value with one or more bit masks.

14. The computer-readable storage medium of claim 9, wherein step (b) comprises matching the identifying data value to a data value of the collection corresponding to a user-manipulatable hardware component.

15. The computer-readable storage medium of claim 14, wherein the user-manipulatable hardware component is a removable media drive.

16. The computer-readable storage medium of claim 9, wherein step (b) comprises matching the identifying data value to a data value of the collection corresponding to a timer configured to issue an activation signal at a pre-determined time.

17. An apparatus comprising:
   a processor;
   a plurality of hardware components, each of the hardware components configured to issue a signal causing the apparatus to return to a fully-powered, active state;
   a first memory having stored thereon a Basic Input Output System (BIOS), the BIOS including instructions for storing one of a plurality of identifying data values upon return of the apparatus to the fully-powered, active state in response to a signal from one of the plural hardware components, each of the identifying data values corresponding to a different one of the plural hardware components; and
   a second memory, the second memory having stored thereon data representing sequences of instructions which, when executed by a processor, cause the processor to perform steps of a method, the method including automatically retrieving a stored identifying data value, comparing the retrieved data value with a collection of data values, each data value of the collection corresponding to a different one of the plural hardware components, each data value of the collection having one or more associated actions, performing the one or more actions associated with a data value of the collection corresponding to a hardware component of the plurality causing return of the apparatus to the fully-powered, active state.

18. The apparatus of claim 17, wherein at least one of the plural hardware components comprises a removable media drive configured to transmit a signal, upon placement of a removable medium in the drive, causing the apparatus to return to the fully-powered, active state.

19. The apparatus of claim 17, wherein at least one of the plural hardware components comprises a timer configured to:

receive as an input a value for an activation time, transmit at the activation time a signal causing the apparatus to return to the fully-powered, active state.

20. The apparatus of claim 17, wherein the second memory further includes instructions for performing the additional steps of:

receiving a designation of an action to be performed in response to return of the apparatus to the fully-powered, active state in response to a signal from a specified one of the plural hardware components, and associating the designated action with a data value of the collection corresponding to the specified hardware component.

* * * * *